United States Patent
Phillips et al.

(10) Patent No.: US 9,950,331 B2
(45) Date of Patent: Apr. 24, 2018

(54) APPARATUS AND METHOD FOR COATING PARTICULATE MATERIAL

(71) Applicant: BASF Corporation, Florham Park, NJ (US)

(72) Inventors: Laura Beth Phillips, Pleasantville, IA (US); Brent Christopher Packer, Ames, IA (US); David Chamberlain Roller, Kokomo, IN (US); Richard Alan Moffitt, Jr., Marion, IA (US); Douglas Edward Grunder, Mt Vernon, IA (US)

(73) Assignee: BASF Corporation, Florham Park, NJ (US)

( * ) Notice: Subject to any disclaimer, the term of this patent is extended or adjusted under 35 U.S.C. 154(b) by 50 days.

(21) Appl. No.: 14/785,283

(22) PCT Filed: Apr. 24, 2014

(86) PCT No.: PCT/US2014/035272
§ 371 (c)(1),
(2) Date: Oct. 16, 2015

(87) PCT Pub. No.: WO2014/176413
PCT Pub. Date: Oct. 30, 2014

(65) Prior Publication Data
US 2016/0082458 A1  Mar. 24, 2016

Related U.S. Application Data (60) Provisional application No. 61/816,353, filed on Apr. 26, 2013.

(30) Foreign Application Priority Data

May 20, 2013  (EP) .................................... 13168449

(51) Int. Cl.
*B05B 12/00* (2006.01)
*B01J 2/10* (2006.01)
(Continued)

(52) U.S. Cl.
CPC ............. *B05B 12/006* (2013.01); *B01J 2/006* (2013.01); *B01J 2/10* (2013.01); *B05B 1/14* (2013.01);
(Continued)

(58) Field of Classification Search
None
See application file for complete search history.

(56) References Cited

U.S. PATENT DOCUMENTS 3,735,532 A * 5/1973 Long, III .................. B24C 3/30
451/81
5,714,263 A  2/1998 Jakubisin et al.
(Continued)

FOREIGN PATENT DOCUMENTS

WO  2012109432 A1  8/2012

OTHER PUBLICATIONS

International Search Report and Written Opinion for PCT/US2014/035272, dated Sep. 23, 2014, 8 pages.

*Primary Examiner* — Jethro M Pence
(74) *Attorney, Agent, or Firm* — Armstrong Teasdale LLP (57) ABSTRACT

A method and apparatus are defined for coating a particulate material. The apparatus includes a mixer having a mixing chamber. A quantity of particulate material is fed into an inlet of the mixing chamber. An agitator is provided for mixing and conveying the particulate material. A feed system is also provided for delivery of a coating into the mixing chamber. The coating is delivered as an atomized spray directed at the mixing particulate material within the mixing chamber. A controller is provided for adjusting the flow of
(Continued)

US 9,950,331 B2

Page 2 the coating into the mixing chamber based on the volumetric feed rate of the particulate material.

17 Claims, 10 Drawing Sheets (51) Int. Cl.
*B05B 1/14* (2006.01)
*B05B 12/12* (2006.01)
*B05B 15/00* (2006.01)
*B05B 7/12* (2006.01)
*B01J 2/00* (2006.01)

(52) U.S. Cl.
CPC ................ *B05B 7/12* (2013.01); *B05B 12/12* (2013.01); *B05B 15/003* (2013.01)

(56) References Cited

U.S. PATENT DOCUMENTS

| 5,866,201 A | 2/1999 | Blue |
| 2003/0201154 A1* | 10/2003 | Hallstrom ............ B65G 25/065 198/773 |
| 2004/0228207 A1 | 11/2004 | McNeff et al. |

* cited by examiner

APPARATUS AND METHOD FOR COATING PARTICULATE MATERIAL

FIELD OF THE INVENTION

The present disclosure relates to an apparatus and a method for coating a particulate material. The apparatus and method may each in one form be applied to the coating of landscaping materials, such as wood mulch.

BACKGROUND OF THE INVENTION

Apparatus and methods for coating landscaping materials and particulate ground cover materials are known. Winistorfer et al, U.S. Pat. No. 6,551,401, shows and describes a machine for coloring landscaping materials, such as wood mulch and the like. The apparatus in Winistorfer patent may be used for continuous mixing of the colorant with the mulch material within a multistage mixing bowl. The disclosure in this prior patent is incorporated herein by reference.

Greenberg et al. U.S. Pat. No. 5,910,514, describes a colored rubber material formed to simulate wood mulch. Rondy U.S. Pat. No. 5,192,587 describes the use of a continuous auger screw within an angled trough for applying colorant to mulch materials. Other apparatus and methods are known for coating of materials, including wood and rubber particulate material. Various methods may be performed as a continuous process or on a batch basis.

SUMMARY OF THE INVENTION

In one aspect of the disclosure, an apparatus is provided for coating a particulate material. The apparatus includes a mixer having a mixing chamber. Means is provided for feeding a quantity of particulate material into the mixing chamber. An agitator is provided in the mixing chamber for mixing and conveying the particulate material to a discharge outlet. A coating feed system is also provided for delivery of a coating into the mixing chamber during mixing by the agitator. The coating is delivered as an atomized spray directed towards the mixing particulate material. A controller is provided for adjusting the flow of the coating into the mixing chamber based on the volumetric feed rate of the particulate material.

In a further aspect of the apparatus, the feeding means may be formed as a slat conveyor. The agitator may be formed by a rotating shaft having a plurality of paddle blades positioned on arms projecting from the shaft. The coating may be a mixture and may include a carrier, which is preferably a pressurized water flow. The pressurized carrier may be provided at relatively high pressure, preferably at least about 689.5 kPa (100 psi). The mixing chamber may be defined in part by an elongated trough. Further, at least one weir plate may be provided within the trough.

In a still further aspect of the apparatus, sensors may be provided for generating signals proportional to the volume of particulate material directed from the feeding means to the mixing chamber. The controller may receive the sensor signals to generate a control signal directed to the coating feed system to adjust flow of the coating into the mixing chamber. The coating feed system may further include a plurality of spray nozzles, with each nozzle directing a controlled spray at a set position along the mixing chamber.

In a further aspect of the disclosure, a method of coating a particulate material is provided. The method includes measuring the volumetric flow of a particulate material directed into a mixing chamber. The particulate material is mixed within the mixing chamber and conveyed towards a discharge outlet. An atomized coating spray is directed towards the mixing particulate within the mixing chamber. The quantity of coating spray is controlled as a function of the feed rate of the particulate material.

Other features and combinations of features will become apparent from the detailed description to follow, taken in conjunction with the accompanying drawings.

BRIEF DESCRIPTION OF THE DRAWINGS

For the purpose of illustrating the invention, the drawings show forms that are presently preferred. It should be understood that the invention is not limited to the precise arrangements and instrumentalities shown in the drawings.

DETAILED DESCRIPTION

In the figures, where like numerals identify like elements, there is shown an embodiment of an apparatus for performing a process for mixing particulate material with a coating. The mixing apparatus is designated generally by the numeral 10 in FIG. 1 and, as illustrated, defines as a continuous process. The apparatus 10 includes feed means 12 for delivering particulate material into a mixer 14. The feed means 12 controls the rate of flow of particulate into the mixer 14. Storage means 16 and 18 are shown positioned adjacent the apparatus 10 for storing and delivering a coating material or constituent parts of a coating mixture. The storage means may be provided in any number of forms, but is typically contemplated to be a barrel, tote or other container. Two storage means are shown. A single container may alternatively be provided or more than two containers may be provided. Other delivery means may be provided for directing a coating to the apparatus 10.

The material stored in the storage means 16, 18 is generally contemplated to be in a liquid or slurry form. Coatings may be any material that is applied to the particulate to provide an aesthetic or functional attribute. One coating example is a colorant, which is a material containing a pigment or dye that is applied to change or augment the color of the particulate. A functional additive may be combined with other coating materials or may form the coating by itself. A functional additive is typically a material that provides a functional attribute, such as encouraging or deterring plant growth, controlling insects or other pests, controlling the advancement of fungi, providing a fragrance, etc. A carrier may be added to the flow of the coating material. In a preferred process, the carrier is water. In addition, the carrier is preferably supplied separate from the coating material(s) retained within the storage means. The carrier material is typically mixed with the coating material to form a coating mixture. Generally, a coating mixture is defined as being a mixture of two or more materials, which may be selected from a group comprising coatings, colorants, functional additives and carriers.

The storage means 16, 18, as shown, are connected with pumping means 24 for directing the coating (etc.) to a coating delivery system (discussed further below) within the mixer 14. Any desired form of pump may be provided, with peristaltic pumps being one preferred form for delivering the coating materials. For the high pressure carrier flow, one pump example is a multi-stage pressure pump. Again, other pump forms may be utilized. A controller 20 is shown adjacent the pumping means 24 and the mixer 14. The pumping means or controller may be mounted on the frame of the mixer or otherwise located. The controller 20 may take any number of forms and be provided with various communication capabilities. The controller may perform one or more functions, such as remote operational monitoring and control, data extract, software update, general maintenance, etc. One possible example of a controller/control panel is an Allen Bradley Micrologix 1400 PLC sold by Rockwell Automation of Milwaukee, Wis.

A discharge mechanism 22 is provided at a discharge end of the mixer 14. The discharge mechanism 22 is shown as a belt conveyor and is intended to transport coated particulate material away from the mixer 10 and direct it for further processing. Other processing steps, packaging operations or storage methods (not shown) may be utilized or added, as desired. A drive motor 26 is mounted on the mixer 14 for rotation of an agitating conveyor (discussed below) within the mixer 14. A hydraulic drive motor 28 is provided to drive the feed means 12 and the discharge conveyor 22.

The feed means 12 comprises a hopper 32 having a floor forming a conveyor 30 for moving particulate material deposited within the hopper 32 towards a discharge. The hopper 32 is connected with an inlet 42 for the mixer 14. Two baffles 36A, 36B are provided at the discharge end of the hopper 32. A web 35 formed from chains (or similar structures) extends across the open top of the hopper 32. The web 35 serves to disturb the particulate 34A deposited in the hopper 32 and assists in leveling the particulate 34A as it is moved by the conveyor 30 towards discharge.

Figure 2:
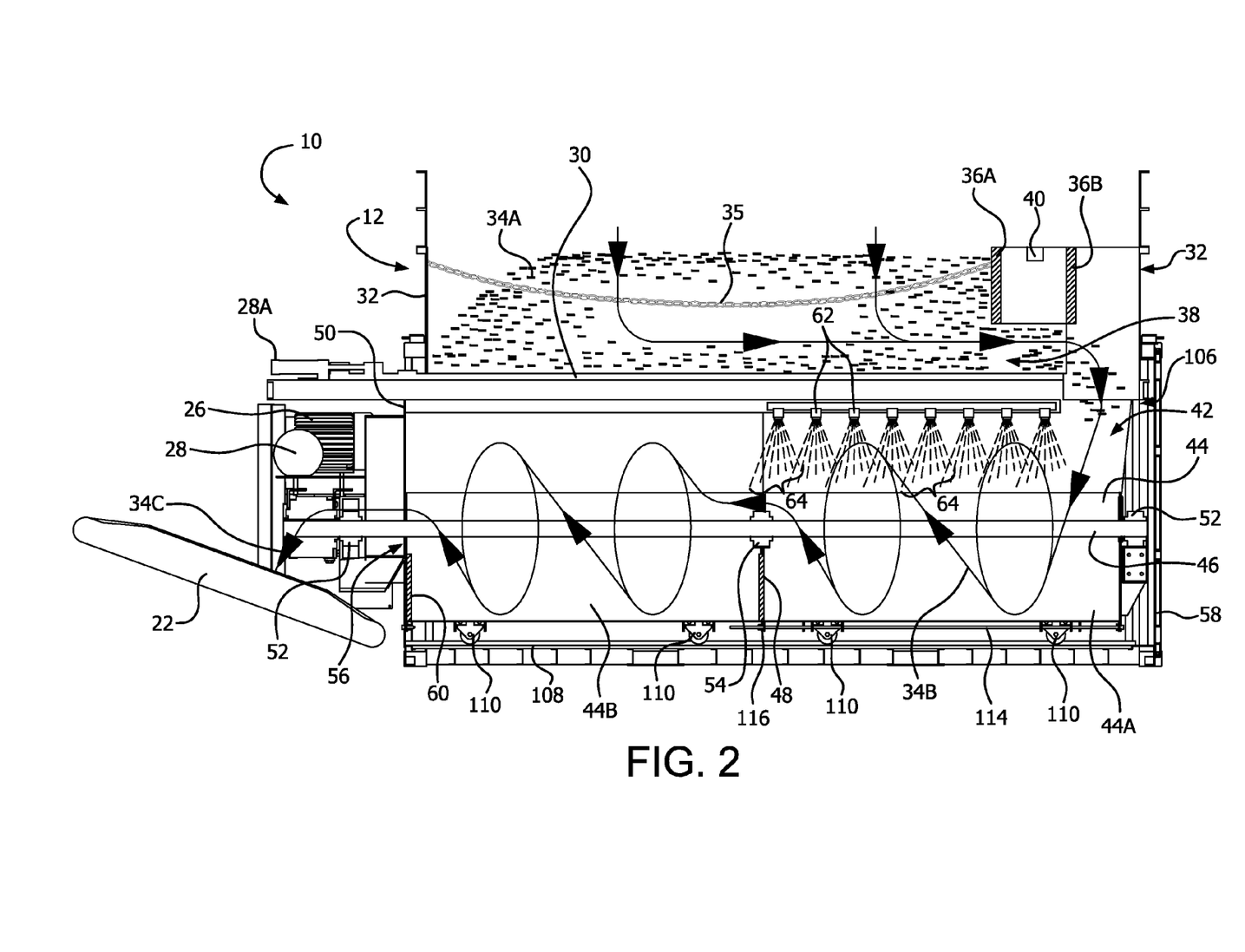
FIG. 2 shows a cross sectional view of the apparatus with certain material flow patterns illustrated within a feed conveyor portion and a mixer portion thereof.

In FIG. 2 there is shown the general flow of particulate material 34A through the apparatus 10. The feed means 12 includes a conveyor 30 forming the floor for the hopper 32. Particulate feed material 34A is deposited into the hopper 32 and sits on top of the conveyor 30. The conveyor 30 moves the particulate feed 34A towards the baffles 36A, 36B (to the right in FIG. 2). Although two baffles are shown, one or more baffles may be provided. The baffles 36A, 36B extend across the hopper 32 and define a control gate 38 for the particulate flow. In the embodiment shown, the first baffle 36A defines the maximum height of the flow of particulate through the gate 38. However, the baffles may be set at a variety of heights, with the flow control acting in sequence (or otherwise) in defining the height of the particulate flow.

The chain web 35 engages the particulate feed 34A and agitates the material to break-up or otherwise settle the bulk pile.

One or more sensors 40 (two being shown) are provided between the baffles 36A, 36B to measure the height of the feed material 34A passing under the baffle 36A and through the gate 38. The signals from the sensors 40 are sent to the controller 20 and are used to calculate the cubic meters per minute (cubic yards per minute) feed rate into the mixer 14. The overall volumetric flow is a function of the incremental rate of the movement by the conveyor 30 multiplied by the width of the hopper (which is typically fixed) and the height of the particulate passing under the baffle 34A. For a relatively full hopper 32, the particulate 34A will have a maximum height defined by the bottom edge of the baffle 36A. The sensors 40 are contemplated to create a more accurate measurement of the height of the particulate 34A, particularly where the flow passes freely under the baffle 36A.

After moving through the gate 38, the particulate feed 34A passes under the second baffle 36B (if provided) and falls into a mixer inlet 42 at the end of the conveyor 30. The mixer inlet 42 is connected with the mixer 14, having a defined mixing chamber therein. A trough 44 defines the base of the mixing chamber and extends along the longitudinal length of the mixer 14. A shaft 46 is provided for rotation of an agitating conveyor (discussed below). The trough 44 is divided into two sections 44A, 44B by a weir plate 48. The shaft 46 is mounted in the mixer 14 and is supported at each end by a bearing 52. A central support bearing 54 is also shown as mounted on top of the weir plate 48. The drive motor 26 is connected to the shaft 46 at the discharge end 50 of the mixer 14. A discharge opening 56 is provided in the mixer housing 58 at the discharge end 50 of the mixer 14. A discharge weir 60 is positioned at the end of the trough 44, adjacent the discharge opening 56.

A plurality of nozzles 62 are provided above the trough 44 and are shown to be positioned in the initial portion of the mixing chamber. The nozzles 62 are aligned axially along the mixing chamber with a series of plenums and valves (discussed below) directing the constituent parts of a coating mixture to the nozzles 62. Other nozzle positions and alignments are possible without departing from the contemplated invention. The nozzles 62 preferably convert the coating or coating mixture to an atomized spray 64. Further, the atomization of the coating or coating mixture is created by a relatively high pressure liquid flow and without the addition of a pressurized gas, such as air. The nozzles 62 direct the atomized spray 64 towards the mixing particulate 34B within the mixing chamber.

As generally illustrated by the arrows in FIG. 2, an agitator mixes the particulate 34B within the trough 44 while conveying it towards a discharge end 50 of the mixing chamber. The weir plate 48 serves to control the flow of mixing particulate 34B within the trough 44. The position of the weir plate may be varied as desired and other weir plates may be added. The nozzles 62 are positioned above the first trough portion 44A. A discharge weir 60 also serves to control flow of particulate 34B, generally increasing residence time for the particulate 34B within the mixing chamber. The coated particulate 34C is ultimately directed through the discharge opening 56 by the agitator. The discharge particulate 34C passes through the discharge opening 56 and onto the discharge mechanism 22, which is shown to be a belt conveyor.

Figure 1:
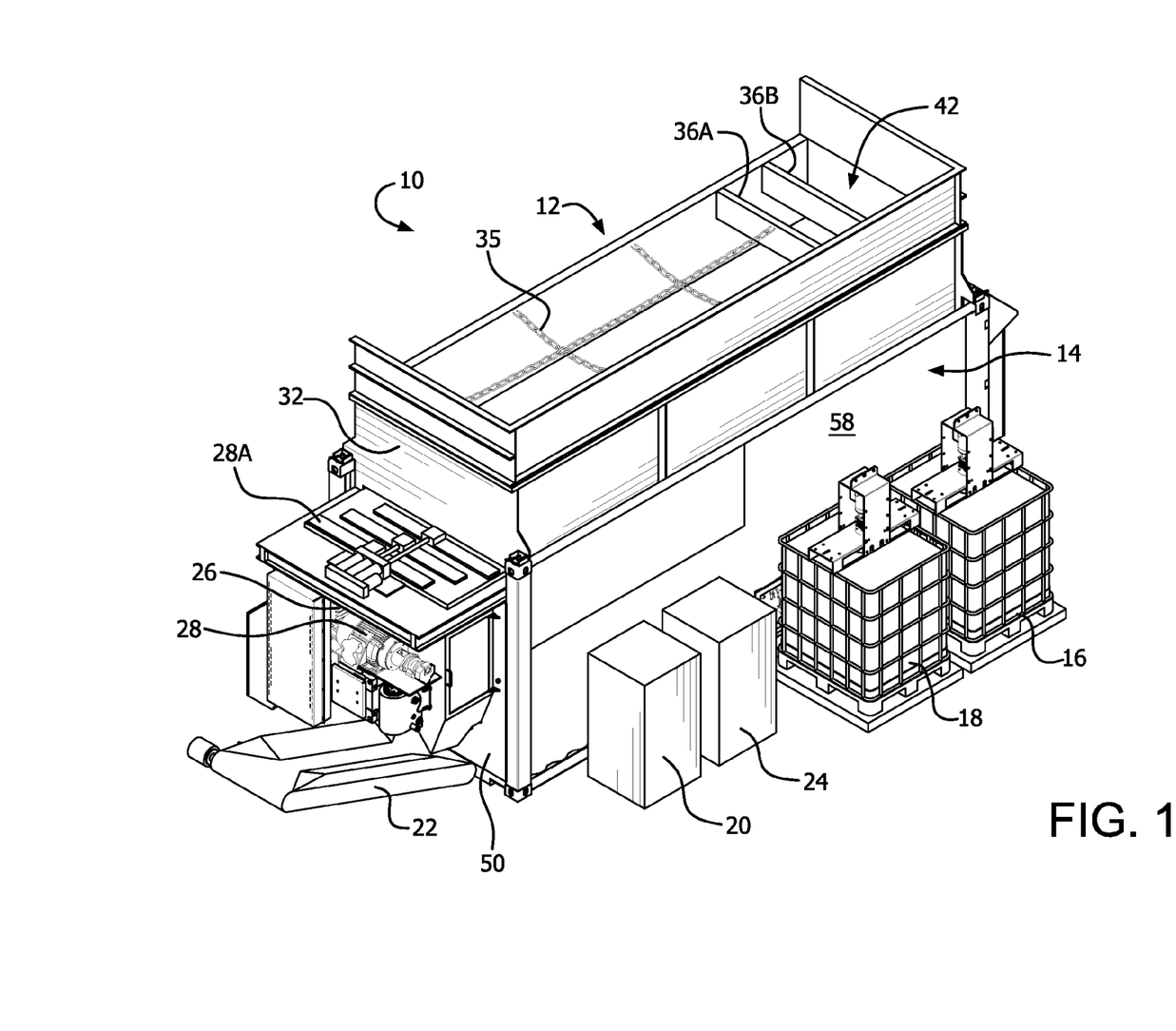
FIG. 1 shows an isometric view of an embodiment of an apparatus for performing a method contemplated by the present disclosure.
Figure 3:
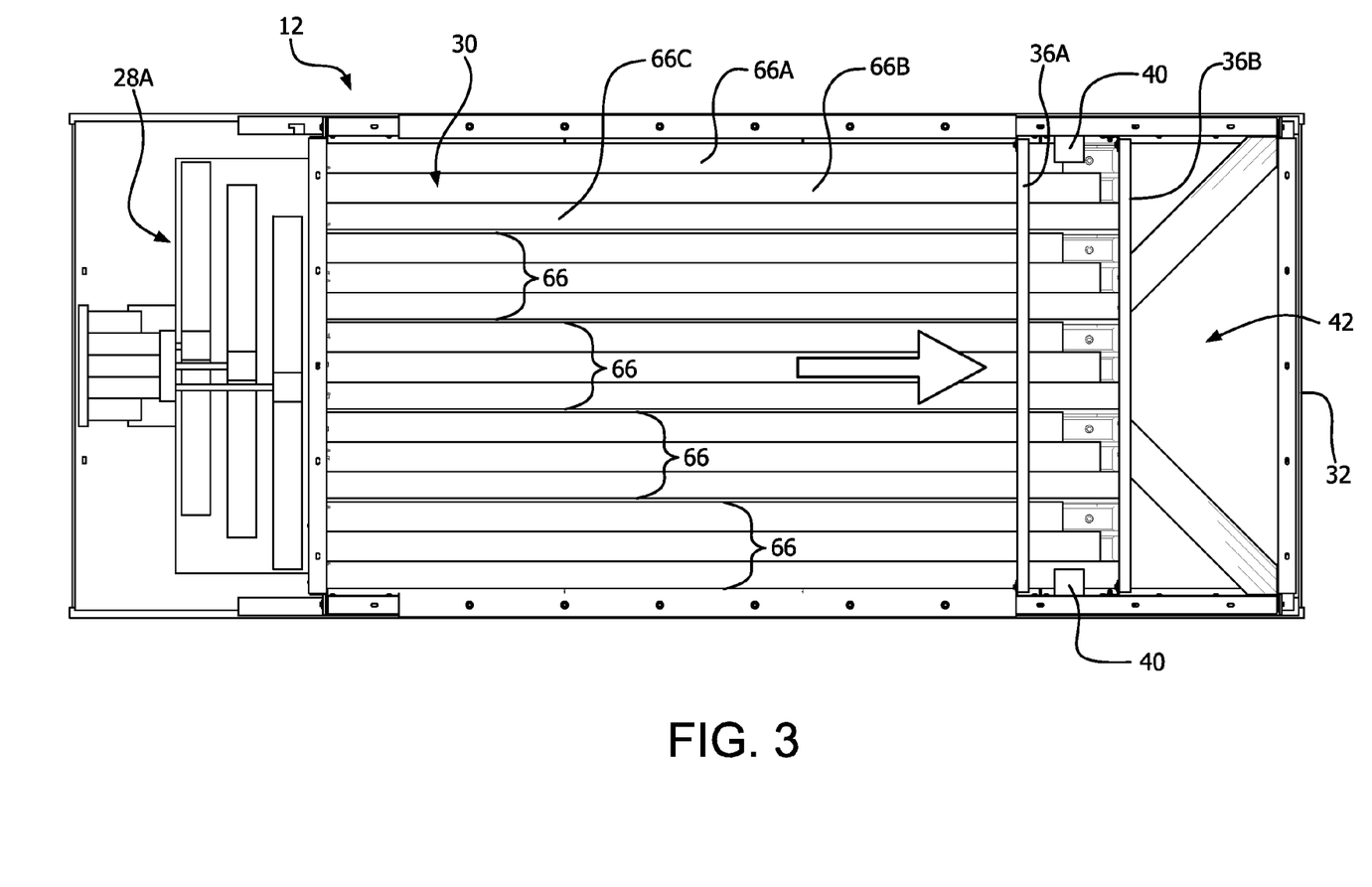
FIG. 3 shows a top plan view of a feed conveyor portion of the apparatus.
Figure 4:
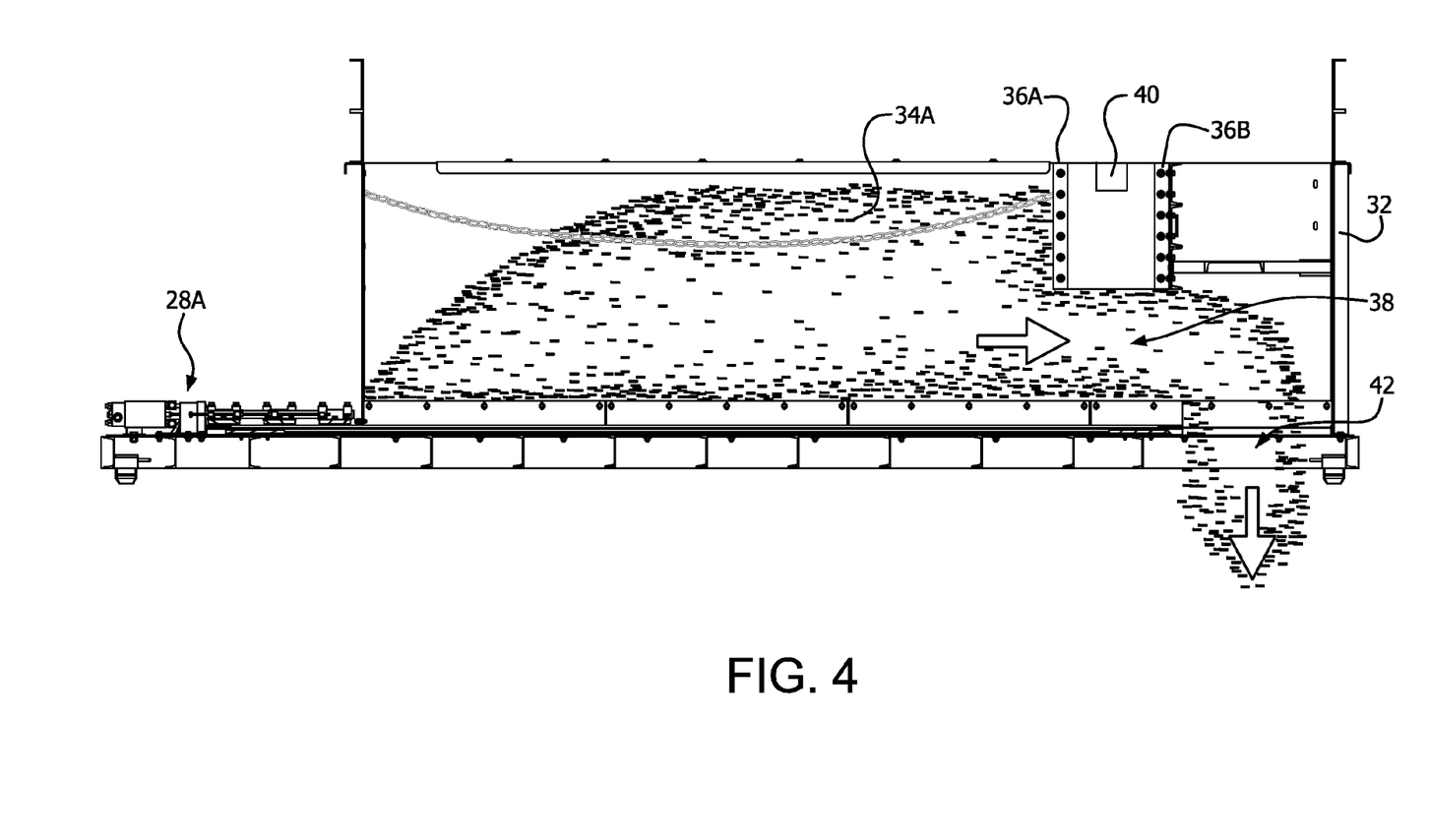
FIG. 4 shows a cross sectional view of the feed conveyor of FIG. 3 with feed material shown as being conveyed towards an inlet of the mixer portion of the apparatus.

The feed means 12 is shown in more detail in FIGS. 3 and 4. The particulate feed 34A is initially directed into the hopper 32 by any desired method, including front end loader, conveyor, etc. The feed 34A may include any number of materials, such as wood mulch, chipped or crumb rubber or plastic materials. The feed material 34A is contemplated to be stored in bulk prior to introduction into the apparatus 10. The particulate feed may also be provided to the hopper by other means, such a being fed directly from a grinder (not shown), used to convert unprocessed material to a particulate form. The conveyor 30 is preferably in the form of a slat conveyor having a push-pull type operation. Slats 66 are provided longitudinally along the conveying surface and are typically operated in sets of three 66A, 66B and 66C. The slats 66A, 66B, 66C move together toward the discharge end to incrementally convey the particulate material 34A. The slats 66 return to the initial starting position in sequence. Hence, during reset of the conveyor, only one slat in each group of three is returning at a time, with two slats remaining fixed. The friction of the load on the two non-moving slats in the set keeps the load from moving backwards along with the one returning slat. Once the three slats have all returned to their incremental starting position, the conveying cycle is repeated. The slat conveyor 30 is contemplated to be powered by a hydraulic motor 28 (FIGS. 1 and 2). The motor 28 is connected to a slat actuator 28A, which is generally illustrated adjacent the hopper 32 at the opposite end from the gate 38 and the conveyor discharge. A slat conveyor of the type described may be provided from any number of sources, including systems produced by Hallco Industries, Inc. of Tillamook, Oreg. and Keith Manufacturing Co. of Madras, Oreg. The hydraulic drive 28 may have a variable speed control for adjusting the rate of feed by the conveyor 30. The conveying speed may be adjusted through the controller 20 or otherwise. The stroke length per cycle of the slats may be adjustable to also assist in controlling the particulate flow rate.

The slat conveyor 30 directs the feed material 34A towards the control gate 38 formed below the baffle 36A. The bottom edge of the baffle 36A defines the height of the gate 38, with the side walls of the hopper 32 and the conveyor slats 66 further defining the dimensions of the gate 38. The chain web 35 extends across the hopper 32 and is contemplated to be at least partially covered in normal operation by the accumulated particulate feed material 34A. As shown, the chain web is connected at various positions within the hopper 32 and to the baffle 36A. As the particulate feed 34A is moved by the conveyor 30 towards the gate 38, the pile of particulate 34A is subject to agitation and shearing forces, serving to break up and level the pile as it approaches the baffle 36A.

The position of the baffle 36A (and baffle 36B) may be adjusted to set the maximum volume of feed material 34A passing through the gate 38 during operation of the conveyor 30. The width of the gate 38 is contemplated to be fixed. The sensors 40 are positioned at the gate 38 to assist in the volumetric flow measurement for the feed material 34A passing through the gate 38 and into the inlet 42 of the mixer 14. The sensors 40 are contemplated to provide a more accurate height measurement; for example, to adjust for a particulate flow having a height less than the bottom edge of the baffle 34A. One possible sensor-type may be an ultrasonic sensor, such as those sold by Pepperl+Fuchs of Twinsburg, Ohio. The conveyor 30 and sensor 40 are contemplated to receive signals from and send signals to the controller 20. The signals are used by the controller 20 to operate the apparatus 10 and the controller 20 may be programmed to adjust the conveyor speed. Stroke length may be manually adjusted.

Figure 5:
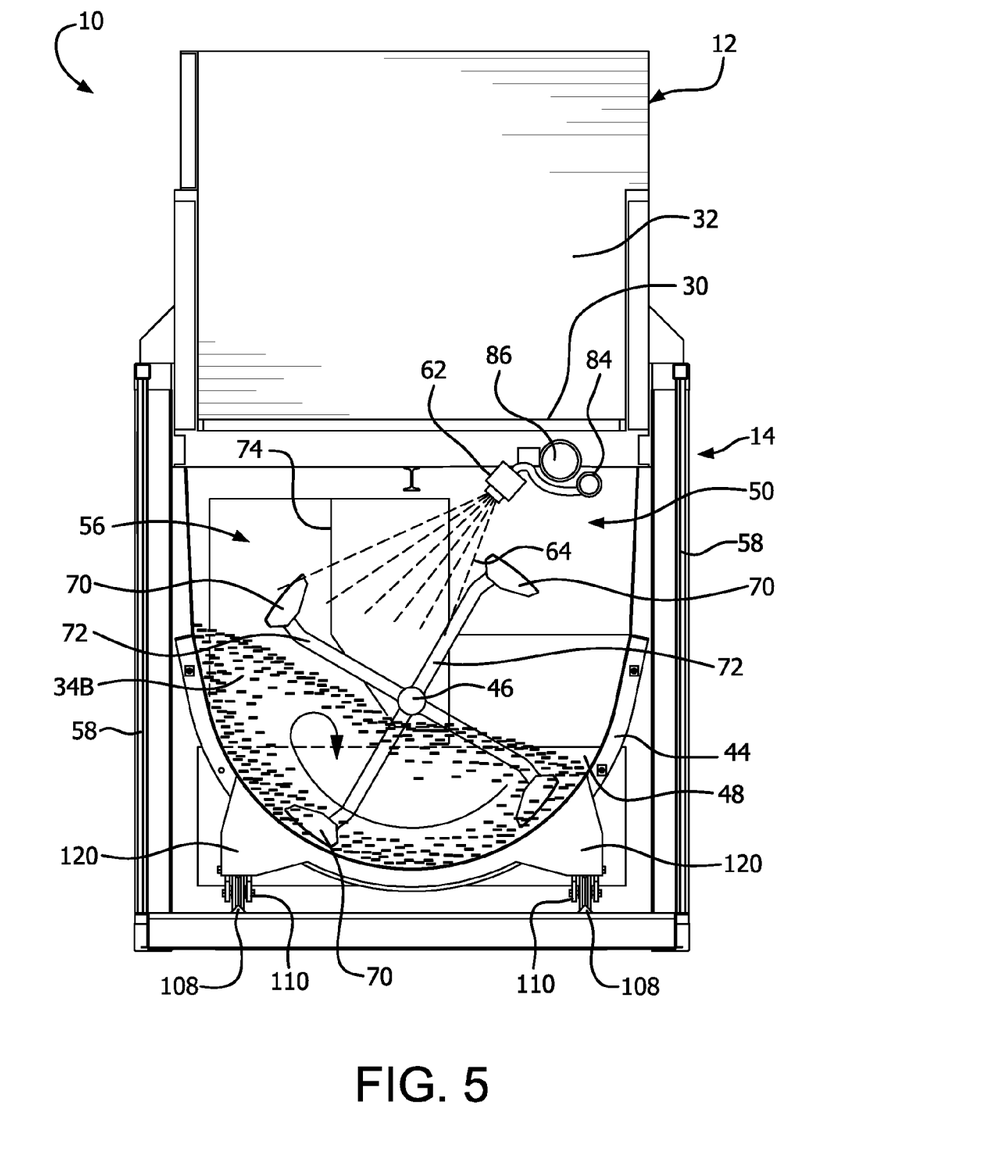
FIG. 5 shows a cross sectional view in the direction of the discharge end of the mixer portion of the apparatus.

In FIG. 5, the interior of the mixer 14 is shown in the direction of the discharge end 50 and discharge opening 56. The trough 44 forms the base of the mixing chamber and retains the mixing particulate material 34B during agitation and conveyance by paddle blades 70. The paddles 70 are supported on arms 72 that project outwardly from the shaft 46. A housing 74 is provided at the end of the shaft 46 to retain the bearings (52) and the connection to the drive motor (26). The housing 74 is positioned adjacent the discharge opening 56 at the discharge end 50 of the mixer 14, as shown in FIG. 8. The housing 74 and associated bearings (52) may be positioned outside of the walls forming the mixer housing 58. The trough 44 is retained within the plurality of walls that form the mixer housing 58. The trough 44 and surrounding mixer housing 58 define the mixing chamber. One of the spray nozzles 62 is shown positioned above the trough 44 and above the mixing paddles 70. Various portions of the spray nozzles 62 and associated manifolds 84, 86 (FIGS. 6B and 7) may also be located outside of the mixer housing 58.

The spray 64 from the nozzles 62 is directed towards the particulate material 34B as it is lifted by the paddles 70 within the trough 44. The lifting and mixing action of the paddle blades 70 is illustrated by the arrow in FIG. 5. The typical profile of the mixing particulate 34B within the trough 44 is shown as being relatively higher in the forward direction of the agitator, which is contemplated to be rotating clockwise in FIG. 5. A counter clockwise rotation is possible, depending on the arrangement of elements. In addition, alternate forms of mixing apparatus may result in varying directions for the mixing action. The nozzles 62 are shown in an offset position relative to the shaft 46. In this position, the spray 64 extends over the shaft 46 and towards the high side of the mixing particulate 34B. This position of the nozzles 62 may serve to lengthen the spray 64 from nozzle 62 to particulate contact and in effect equalizes and/or maximizes the spread of spray. Other placement and positions for the nozzles are also possible.

The center weir plate 48 is positioned within the trough 44 between the two trough sections 44A and 44B. The weir plate 48 serves to form an impediment to continuous flow through the trough 44 and thus increases retention of the mixing particulate 34B within the mixing chamber. The mixing particulate 34B will accumulate at the upstream side of the plate 48, prior to being lifted over the top edge of the weir 48 by the adjacent paddle blade(s) 70. As shown in FIG. 2, the general flow of the mixing particulate 34B in the mixing chamber is in the direction of the discharge opening 56. The paddle blades 70 on the agitator are normally angled to direct the material flow towards discharge. The paddle blades 70 are contemplated to lift the mixing particulate 34B over the center weir 48, as well as lift the material over the discharge weir 60 at the end of the trough 44. A number of paddle blades may be provided at alternative angles to create a counter flow of the particulate 34B at various positions along the longitudinal length of the trough 44. In one example, for every three sets of forward directed mixing paddles, one set of counter flow paddles may be provided. The counter flow paddles serve to reverse a portion of the mixing particulate 34B, increasing residence time within the mixing chamber and generally increasing the amount of agitation of the particulate with the coating material(s).

In one preferred construction, a total of sixteen arm positions may be provided along the shaft 46. A greater or lesser number of arm positions may be provided. It is further contemplated that the longitudinal position of the paddle arms 72 on the shaft 46 may be adjusted during set-up of the apparatus 10. For example, there may be provided an eight inch adjustment along the shaft 46 for each paddle set. This adjustment of the paddle position may be used to affect material build-up within the mixing chamber, such as adjacent the upstream side of the weir plats 48, 60. The paddle blades 70 moving through this increased quantity of material may result in an increase in the overall load on the drive motor 26. Moving the arms 72, for example, a short distance away from the upstream side of weir plates (48, 60) may serve to reduce or eliminate unnecessary load while not significantly affecting agitation or conveyance by the agitator. Variation in the angular orientation of the paddle blades 70 within adjacent paddle sets may further serve to positively regulate the mixing and flow of the particulate 34B within the mixing chamber. Preferably, the direction of the paddle blades 70 and position of the paddle arms 72 on the shaft 46 creates a generally uniform flow and depth of material within the trough 44.

The controller 20 may further adjust the mixer operation by measurement of motor load. An increase in load on the agitator motor 26 may result from an increase in the overall amount of mixing particulate 34B within the trough 44. The controller 20 may adjust the feed rate of the conveyor 30 to return the particulate flow to a preferred range and motor load. An adjustment of the coating flow may also accompany the adjustment of the particulate feed rate into the mixing chamber. Adjustments to the rotational speed of the agitator may also be accomplished, although it is the preferred that such adjustments do not occur during the operation of the apparatus 10.

Figure 6A:
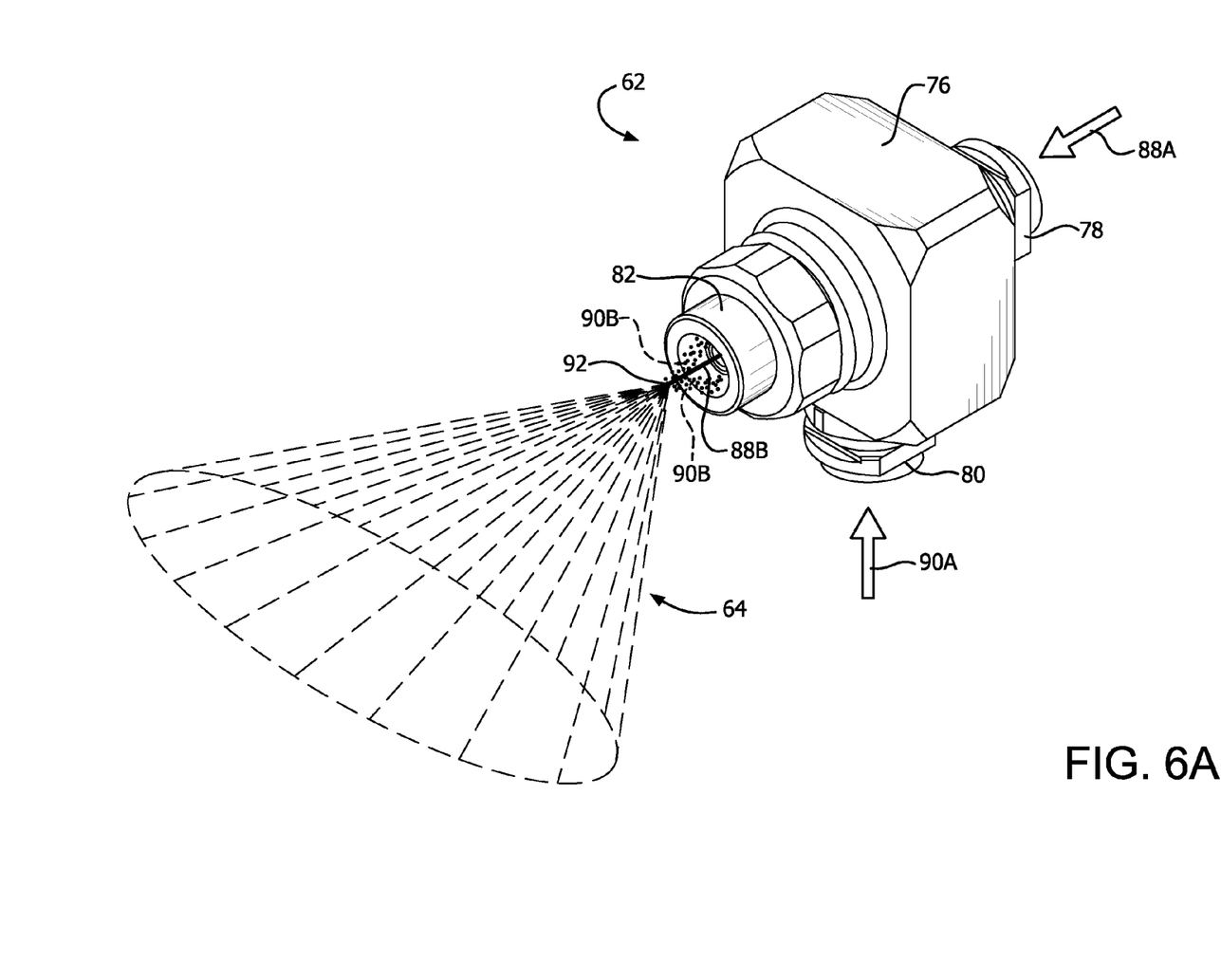
FIG. 6A shows an enlarged, isometric view of a nozzle structure for use in the mixer portion of the apparatus.
Figure 6B:
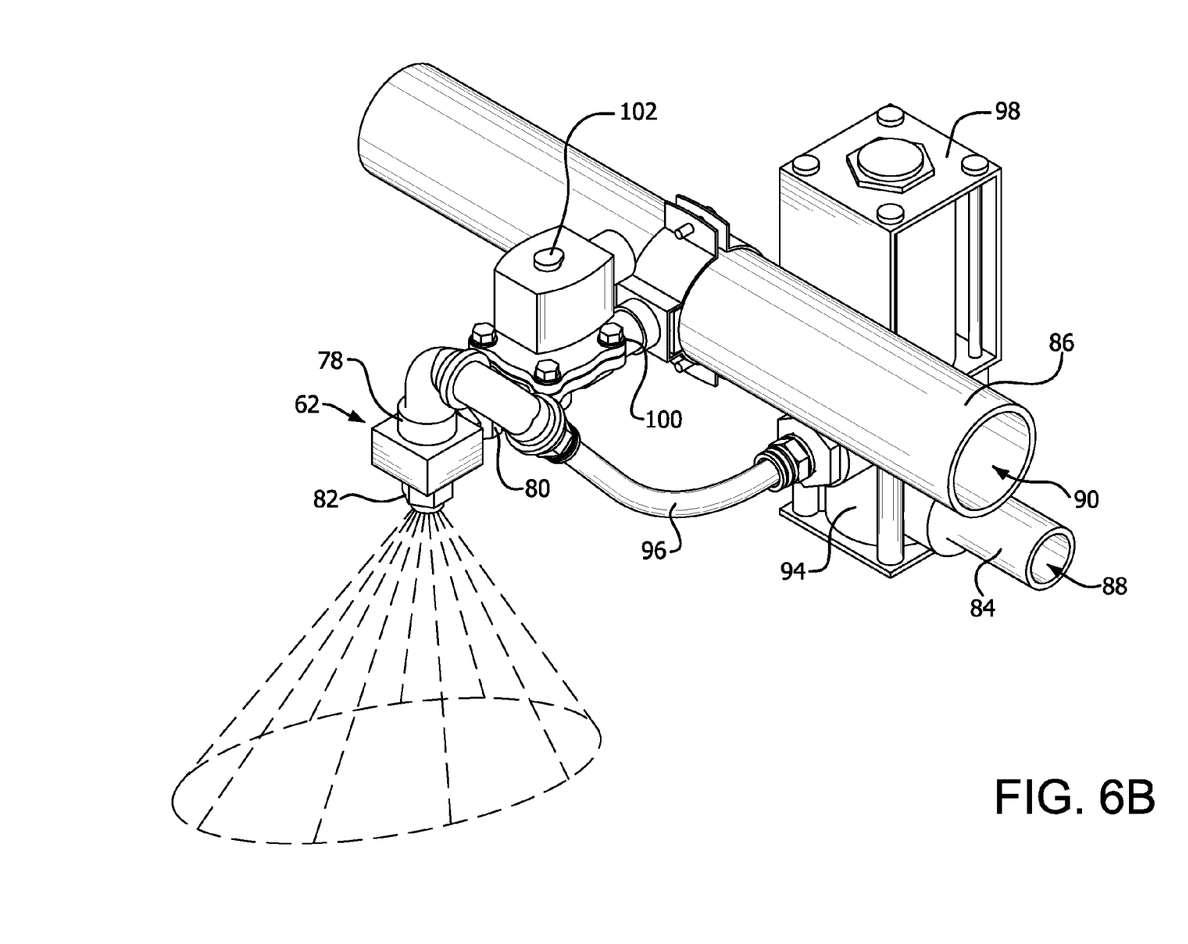
FIG. 6B shows a partial, isometric view of the valve and control structures for the nozzle of the type shown in FIG. 6A.
Figure 7:
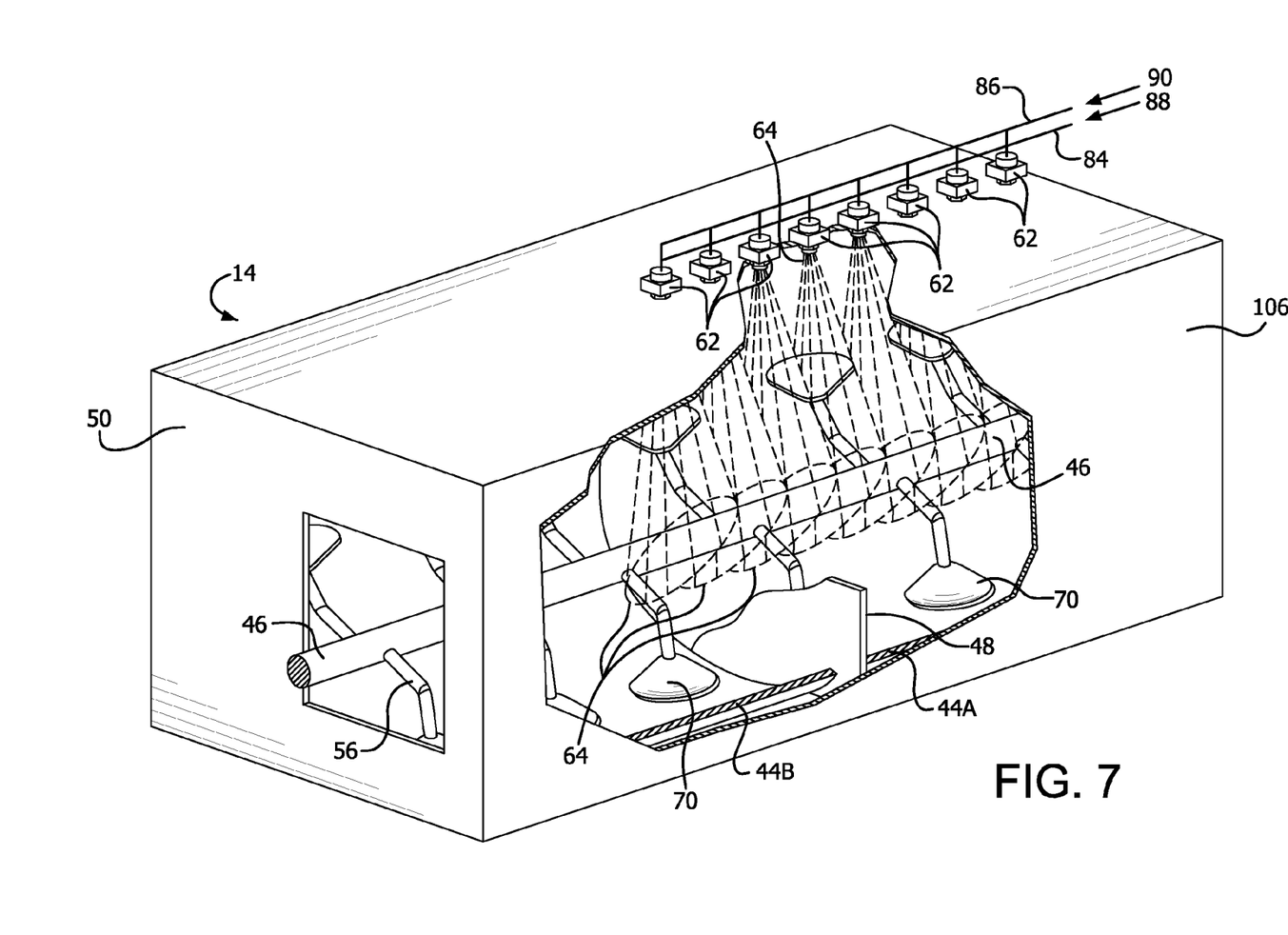
FIG. 7 shows a partial, isometric view of a nozzle spray pattern within the mixer portion of the apparatus.
Figure 8:
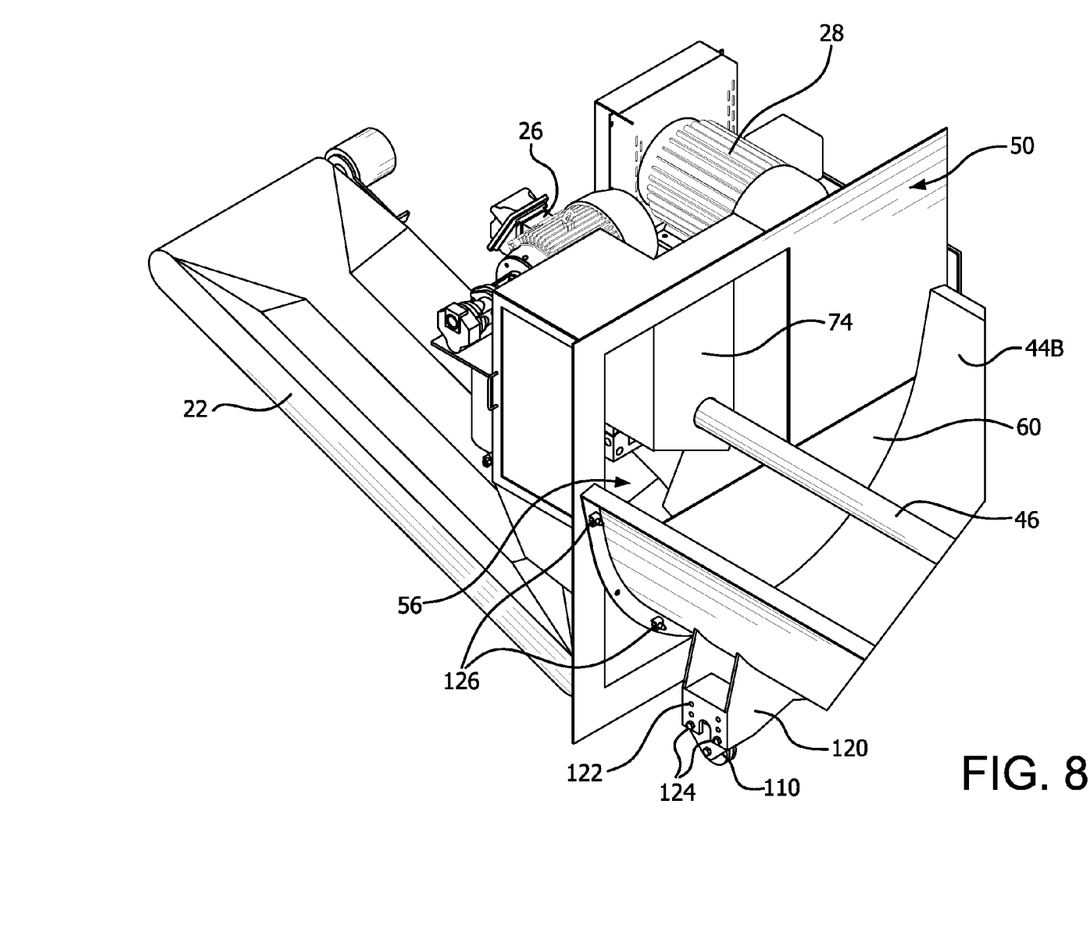
FIG. 8 shows an isometric view of a discharge end of the mixer portion of the apparatus.

Details of the spray nozzles 62 and the spray pattern 64 within the mixing chamber are shown in FIGS. 6A, 6B and 7. In FIG. 6A, the construction of an external mix, atomization type nozzle 62 is shown. The nozzle 62 includes a body 76 having two inlet connections 78, 80 and a single discharge orifice 82. One inlet 78 is contemplated to be connected to a plenum or manifold 84 (FIG. 6B) for feed of the coating or coating mixture received from the storage means 16 and/or 18 (FIG. 1). The second inlet 80 is connected to a second plenum or manifold 86 (FIG. 6B), preferably for feed of a carrier material, which is a high pressure water flow. The nozzle body 76 is constructed to direct these separate flows to the outlet orifice 82, with the orifice 82 combining the two to form the spray pattern 64. As shown in FIG. 6A, the coating flow 88A directed into the inlet 78 forms a concentrated central stream 88B within the orifice 82. The carrier flow 90A is input through the second inlet 80 of the body 76 and forms an outer outlet stream 90B. The carrier outlet stream 90B is channeled along the outer periphery of the orifice 82. The stream 90B impinges on stream 88B at a position 92 downstream from the orifice 82. The two streams 88B, 90B mix together at the impingement position and form the spray pattern 64. As shown in FIGS. 2, 5 and 7 the spray 64 is directed towards the mixing particulate 34B in the trough 44.

In FIG. 6B, there is shown the various feed plenums or manifolds 84 and 86 that generally direct flow 88, 90 from a source to the nozzles 62. In the example shown, a single coating flow 88 is provided through the feed plenum 84. In FIG. 1, two storage means 16, 18 are shown. There may be one or more separate coating materials provided, with only one coating being fed at a time by the pumping means 24 to the plenum 84. Alternatively, two constituent parts may be mixed to form the desired coating mixture directed through plenum 84. A valve 94 is connected to the plenum 84 at the position of the nozzle 62 to direct a portion of the coating flow 88 into the feed pipe 96, which is connected with the nozzle input 78. A valve controller 98 is provided to regulate flow from the plenum 84 to the nozzle input 78. The valve controller 98 is connected to the main controller (20, FIG. 1). A second valve 100 is provided on the carrier plenum 86. The second valve 100 directs a portion of the carrier flow 90 to the second inlet 80 on the body 76 of the nozzle 62. The second valve 100 includes a controller 102, which is also contemplated to be connected to the main controller (20).

FIGS. 2 and 7 generally show the position of multiple nozzles 62 relative to the trough 44 within the mixing chamber. As shown, eight (8) nozzles are provided, with all nozzles positioned above the first trough portion 44A. Any number of nozzles may be provided, depending on the size of the mixing chamber, the feed capabilities of the conveyor (30), the operational coating feed rates, the output capabilities of the nozzles, etc. The nozzle positioning is intended to create an incremental delivery of the coating material to the particulate material 34B within the first trough portion 44A of the mixing chamber. Additional mixing is performed by agitation of the particulate 34B within the second trough portion 44B. Each nozzle 62 is contemplated to be connected to the main coating flow 88 within the associated plenum 84 and the main carrier flow 90 within the second plenum 86. The input into the plenums 84, 86 from the pumps (24) may be located centrally within the line of nozzles (62) to assist in equalizing the flow to each nozzle. A valve (94, 100) and controller (98, 102) of the types shown in FIG. 6B are contemplated to be provided at each nozzle position, with each valve controller (98, 102) in communication with the main controller (20).

As illustrated, the contemplated spray pattern 64 is oval in shape and the adjacent nozzles are contemplated to create an overlapping pattern along the length of the trough portion 44A. Other spray patterns may be utilized as desired, in addition to variation in the number of spray nozzles. The plenum/manifold structures may be modified for directing flow to the nozzles. Multiple pump mechanisms may be provided in addition to metering means associated with the pumps. Additional plenums/manifolds may be provided for the further components of the coating mixture. For example, the properties of one or more a functional additives may necessitate their introduction into the mix at a position closely adjacent the nozzle. The materials may also require other special handling during delivery and mixing. It may also be advantageous in certain applications to provide other types of nozzles or other input structures to add materials, including coatings, carriers or otherwise, to the mixing particulate.

The discharge end 50 of the mixer 14 is shown in further detail in FIG. 8. The agitator shaft 46 extends through the discharge opening 56 and into a protective housing 74, which retains the bearing (52) and drive motor 26. (The paddle blades are not shown within this illustration for clarity of the other structures.) The discharge weir plate 60 is positioned between the opening 56 and the discharge end of the second trough portion 44B. The size and height of the weir 60 may be adjusted to control the flow of particulate material 34B from the mixing chamber. The weir 60 is generally intended to increase residence time of the mixing particulate 34B prior to discharge. The trough portion 44B is bolted or otherwise fixed to the end wall of the mixer housing 58. Preferably, the fixing means for the second trough portion 44B is externally accessible. The discharge conveyor 22 is positioned below the discharge opening 56 for directing the coated material (34C) away from the apparatus 10.

Figure 9:
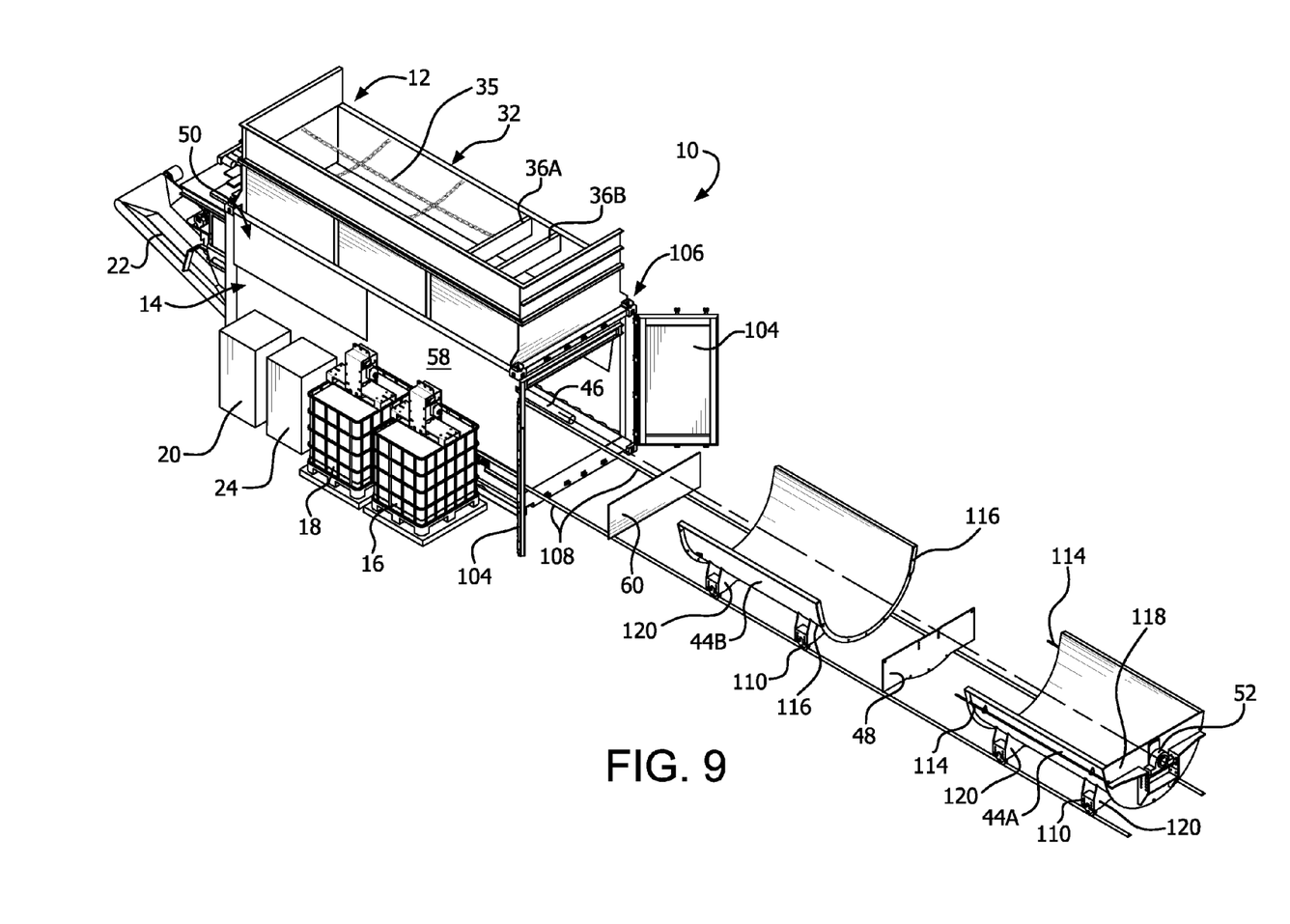
FIG. 9 shows an exploded, isometric view of constituent parts of the apparatus.

An exploded assembly of the mixer 14 is shown in FIG. 9. The trough 44 is separated into two sections 44A, 44B that are attached to one another and retained within the mixer housing 58. Doors 104 are provided at the inlet end 106 of the housing 58. Opening the doors 104 provides access to the assemblies within the mixing chamber, including the trough 44, the shaft 46 (and its associated paddles, not shown), the weir plates 48, 60, etc. The trough sections 44A, 44B are supported on rails 108 within the housing 58. The trough sections 44A, 44B include rollers 110 that ride on the rails 108 (see, also, FIGS. 1, 5 and 8.) Once the doors 104 are opened for access to the trough 44, the trough sections may be disconnected from one another, along with related structures, and removed from the housing 58. Rail extensions are shown for rolling of the first trough section 44A out of the housing after being detached from the second trough section 44B. The second section 44B may similarly be removed. As an alternative to the rail extensions (as shown), the trough sections may be removed from the housing 58 by a fork lift or other lifting mechanism as the trough is being rolled towards the open doors 104.

Rod members 114 are provided on the outside of the first trough section 44A. The rod ends engage a connector 116 on the second trough section 44B to retain the two sections together. The center weir plate 48 may be fixed to either through section 44A, 44B and is engaged between the sections when secured by the rods 114 and connectors 116. Engagement and disengagement of the rods 114 from the connectors 116 is contemplated to be accomplished from a position adjacent the end wall 118 of the trough section 44A, without the need to move into the housing 58.

During removal of the trough 44, means for supporting the shaft 46 may be required. As shown, the end bearing 52 is supported on the end wall 118 of the first trough section 44A. In FIG. 9, the bearing 52 is separated from the shaft 46. As an alternative, the bearing 52 assembly may be removable from the end wall 118 and remain attached to the shaft 46. In either alternative, a support chain, or the like, may be fixed to the top of the housing 58 and used to suspend the shaft in position as the trough sections 44A, 44B are removed. The central bearing (54) is also contemplated to be detached from the weir plate 48 during disassembly. One or more inspection panels (not shown) may be provided within the housing 58 for access to the internal structures. Other access panels may be provided as desired. In addition, various covering structures may be provided for protection of various components during operation and for protection from the environmental conditions.

The clearance between the paddle blades 70 and the inside surface of the trough 44 is contemplated to be adjustable, for example, up to 10 centimeters (4 inches) or more. Such adjustments may serve to alter mix properties and to accommodate particulate material properties, such as particle size. The adjustment may also serve to reduce load on the drive motor (26) for the agitator. As shown in FIG. 8, the rollers 110 are formed as part of an assembly that is fixed to the trough 44B (and also 44A) by supports 120. The position of the roller 110 and assembly on the support 120 is adjustable. As shown, a series of holes 122 are provided on the support 120. Bolts 124 extend through the holes and engage the roller assembly. Adjusting the position of the bolts 124 within the holes 122 changes the relative position of the rollers 110. This change in position alters the height of the trough 44B (and 44A) relative to the height of the shaft 46 and alters the spacing between the paddle blades (70) and in inside surface of the trough 44. Adjustment of the attachment structures 126 fixing the trough 44B to the end wall of the housing 58 is also contemplated. Further, an accommodation must be made for the end bearing 52 on the end wall 118 of the first trough section 44A (see FIG. 9) due to the relative change in position of the shaft with respect to the trough 44. An adjustable mounting plate may be provided for fixing the bearing 52 to the end wall 118.

Generally, the various components of the apparatus (10) are controlled by the main controller (20). Coating materials are retained within the storage means (16, 18), which are connected to the internal flow plenum (84). The pump (24) is provided for metering the coating flow (88) from storage into the plenum (84). A separate carrier feed is provided and is connected with the pump (24) to provide a flow (90) to the second plenum (86). It is contemplated that a provided coating material, such as a colorant, will include a set recipe for mixing with the water (or other carrier). This recipe will normally include a coating-to-carrier ratio and a coating mixture flow based on volume of particulate fed into the mixer. Other variables may also be included in the recipe, including the addition of functional additives and other materials used for forming the coating mixture. The controller (20) will be set with the parameters of the recipe by manual input or by selection from memory. Identification of the coating material(s) may be manually entered into the controller or may be identified by other means, such as the reading of an RFID chip or a bar code associated with the provided storage means (16, 18).

The typical coating is contemplated to be a mixture of, at least, one coating material and a water carrier. However, a single coating material may be applied without additional additives or a carrier. In such applications, the coating material (or single source mixture) will preferably be delivered to the nozzles (62) through the relatively high pressure, second plenum (86). The pressurized flow (90A) into the nozzle (62) will result in an atomized spray (64) at the outlet orifice (82).

Various sensors may be provided through the apparatus to provide the controller with operational parameters. The sensor signals will normally be processed by the controller and further control signals provided to adjust the operational elements of the apparatus. For example, the storage means may be provided with a scale to determine weight of the coating material and changes thereto during operation. The scale signals may be used to adjust the pump or valves within the plenum system, tuning the mix with the carrier flow.

In operation, signals from the particulate feed means are utilized to control coating flow to the nozzles. The volume of particulate feed (34A) directed through the gate (38) and into the inlet (42) for the mixing chamber is measured. Based on the volume of particulate matter added to the mixing chamber, the amount of coating material/mixture delivered from the nozzles is adjusted to match the recipe for the coating. Further, the carrier material is delivered to the nozzle at a constant (high) pressure for purposes of creating the desired atomized spray. The coating material is provided in an amount to match the carrier flow for the recipe.

In one example of the operation of the apparatus 10, a rough-ground hardwood material is provided to form a feed particulate 34A. A colorant is provided in one storage means 16. A further functional additive, such as a pesticide, plant growth regulator, fragrance, etc. may be provided in the second storage means 18. The colorant coating recipe is input into the controller 20. The recipe will normally define the mix ratio for the colorant and a water carrier, the amount of coating mixture for a given volume of particulate feed, pump settings, conveyor settings, etc. After priming of the 
apparatus 10 and initiation of rotation of the agitator shaft 46, particulate feed 34A is deposited into the hopper 32 and the slat conveyor 30 is placed in operation. The feed material 34A moves under the gate 38, with the sensors 40 measuring height of the material flow. From the sensor data and conveyor speed data, a volumetric flow rate is determined for the particulate directed to the inlet 42 of the mixer 14. The particulate flow rate is then related to the coating mixture delivered by the nozzles 62.

In the embodiment shown, eight nozzles 62 are provided for directing the coating mixture onto the particulate 34B within the mixing trough 44. In operation, the carrier flow 90A directed to the nozzles 62 is delivered at a relatively high pressure. The pressure range is contemplated to fall between 551.6 to 1034.3 kPa (80 to 150 psi) for a high pressure operation, with a preferred pressure of about 689.5 kPa (100 psi). As such, the carrier flow serves as the atomizing agent for the coating mixture. The pressure of the carrier is contemplated to be maintained relatively constant. In determining the overall flow of coating mixture onto the mixing particulate 34B, adjustment of the quantity of coating mixture delivered to the mixing chamber is accomplished by controlling the number of nozzles in operation at any give time. The valves 94, 100 may be adjusted by the controller 20 to turn off a select number of nozzles 62. As an example, normal feed rates for the apparatus may result in the use of six nozzles 62, with two being turned off by the controller 20. An increase in demand for coating material will result in additional nozzles being turned on. A decrease in the particulate feed rate will result in additional nozzles being turned off.

Nozzle adjustment is based on the volume of particulate fed into the mixing chamber and the coating recipe. The recipe will at a minimum set the kilograms per minute (kg/min) of coating and a corresponding liters per minute (1/min) of the carrier for a particulate feed rate in cubic meters per minute ($m^3$/min). Measuring the pressure of the carrier flow is correlated to the 1/min of carrier delivered to the nozzles. In keeping the pressure of the carrier constant (i.e., within a preset range), the carrier flow through each nozzle is relatively constant. On an increasing demand for coating mixture (due to an increase in particulate feed), additional carrier and coating is required. The controller determines the additional coating needs feed and initiates operation of one or more additional nozzles. The addition of operational nozzles is combined with an adjustment of the pumps 24, feeding the coating material from the storage means 16 (and/or 18) and the carrier (water) from its associated supply. The carrier pump is also adjusted through controller to maintain the pressure of the flow 90 within the preset range delivered to the nozzles 62 in operation.

The spray pattern 64 from the nozzles 62 preferably directs the coating mixture onto the particulate 34B along the first half of the longitudinal length of the trough 44. The speed of the agitator shaft 46, the position and number of paddle blades 70, the size and position of the weir plates 48, 60 all serve to affect the overall mixing and conveying operation and the further overall residence time of the mixing particulate within the trough 44. It is contemplated that the nozzles 62 being adjusted on and off will be typically located adjacent the central weir plate 48. Hence, the application of coating mixture by the nozzles will occur at the initial part of the mixing chamber with agitation continuing to occur in the downstream end of the trough 44. Other nozzle positions and alignments may be utilized to regulate flow, as well as to maintain a relatively consistent mixture between the coating materials and (any) carrier delivered by the various nozzles.

The controller 20 maintains the flow of coating by adjustment of the provided pump(s) 24 connected to the storage means 16, 18. The weight change of the stored concentrate may also be used to create a correction to the pump operation, based on the desired recipe. Other forms of measurement for the concentrate may also be used. Adjustments based on manual or sensor input, may be made during operation through the controller 20. Further, adjustments to the particulate feed provided by the conveyor 30 may be accomplished during processing to affect the overall coating operation. Generally, a change in the particulate feed rate delivered to the mixing chamber will vary the load on the agitator and may used to bring the coating mixture feed in line with a desired performance range.

The use of a pressurized carrier flow as an atomizer for a coating mixture is contemplated to create a number of advantages. First, a separate gas compressor for gas (air) atomization of the spray is not required. The elimination of the gas compressor reduces the overall power requirements for the apparatus. In addition, it has been found that the controlled nozzle feed and carrier atomized spray may reduce the overall requirements for carrier (water) and coating material. This reduction in coating use may result in part from the relatively larger atomized particles formed by the carrier atomized coating mixture, as compared to the coating particles formed through a gas atomization process. The relatively larger particles improve distribution of the coating through a higher impact (a function of the mass of the particle and the speed at impact). Ultimately, the use of less of the water or other carrier, within a relatively faster mixing operation, reduces processing time for the coated particulate after discharge from the apparatus. For example, because of the overall use of less water, the coated particulate may be moved more quickly to a bagging operation. In addition, in a colorant type coating operation, the dryer end product is also contemplated to be created without a reduction in intensity of the applied color. An extended mixing (retention time) within the overall operation may further result in better adhesion of the coating and relatively uniform coating of the particulate. Other advantages are contemplated and may be apparent to those of skill in the relevant art after reviewing the present disclosure.

The present disclosure includes a description and illustration of a number of exemplary embodiments. It should be understood by those skilled in the art from the foregoing that various other changes, omissions and additions may be made therein, without departing from the spirit and scope of the invention, with the invention being identified by the foregoing claims.

What is claimed is:

1. An apparatus for coating a particulate material comprising:

a mixer having a mixing chamber;

a conveyor for incrementally feeding the particulate material into the mixing chamber;

a control gate for controlling an incremental volumetric flow of a particulate material feed into the mixing chamber;

sensors for determining the incremental volumetric flow of the particulate material feed into the mixing chamber when the incremental volumetric flow of the particulate material feed is between zero and a maximum value, the sensors being positioned at the control gate to measure a height of the particulate material;

an agitator provided in the mixing chamber, the agitator mixing and conveying the particulate material from an inlet to a discharge outlet;

a coating feed system for delivery of a coating into the mixing chamber during the mixing by the agitator, the coating feed system directing an atomized spray at the mixing of the particulate material within the mixing chamber; and a controller for continuously adjusting a flow of the coating into the mixing chamber based on the incremental volumetric flow of the particulate material feed determined by the sensors, wherein the control gate comprises baffles extending across the conveyor, wherein the sensors are provided between the baffles.

2. The apparatus as claimed in claim 1, wherein the conveyor is a slat conveyor.

3. The apparatus as claimed in claim 1, wherein the agitator is formed by a rotating shaft having a plurality of paddle blades positioned on arms projecting from the rotating shaft.

4. The apparatus as claimed in claim 1, wherein the coating comprises a mixture of a coating material and a pressurized carrier.

5. The apparatus as claimed in claim 4, wherein the pressurized carrier is water.

6. The apparatus as claimed in claim 4, wherein the pressurized carrier is pressurized to at least about 689.5 kilopascal (kPa).

7. The apparatus as claimed in claim 1, wherein the sensors provide sensor signals that are combined with signals from the conveyor to determine the incremental volumetric flow of the particulate material feed.

8. The apparatus as in claim 7, wherein the sensor signals are based on the height of the particulate material at a feed input position, and the sensor signal signals are combined with feed rate signals to determine the incremental volumetric flow of the particulate material feed.

9. The apparatus as claimed in claim 8, wherein the controller receives the sensor signals and the feed rate signals and directs a control signal to the coating feed system to adjust the flow of the coating into the mixing chamber.

10. The apparatus as claimed in claim 1, wherein the coating feed system comprises a plurality of spray nozzles.

11. The apparatus as in claim 10, wherein the spray nozzles direct the atomized spray within an initial portion of a length of the mixing chamber.

12. The apparatus as in claims 10, wherein an adjustment of a flow rate of the atomized spray from the plurality of spray nozzles by the controller includes regulating a number of operational spray nozzles within the plurality.

13. The apparatus as claimed in claim 10, wherein each of the plurality of spray nozzles comprises an inlet for a coating material and a separate inlet for a carrier material and wherein a coating mixture of the coating material and the carrier material is formed by each of the plurality of spray nozzles at an outlet orifice.

14. The apparatus as claimed in claim 13, wherein the carrier material of the coating mixture is pressurized to create a pressurized carrier at the inlet for the carrier material to each of the plurality of spray nozzles and wherein the pressurized carrier creates the atomized spray at the outlet orifice without an additional pressurized gas.

15. The apparatus as claimed in claim 4, wherein an adjustment of a flow rate of the coating is based on a preset ratio of kilograms per minute (kg/min) of the coating material and liters per minute (l/min) of the pressurized carrier to a feed rate in cubic meters per minute ($m^3$/min) of the particulate material.

16. The apparatus as in claim 1, wherein the mixing chamber is defined in part by an elongated trough.

17. The apparatus as in claim 16, wherein at least one weir plate is provided within the elongated trough for increasing residence time of the particulate material within the mixing chamber.

* * * * *